(12) United States Patent
Kim (10) Patent No.: US 10,754,087 B2
(45) Date of Patent: Aug. 25, 2020

(54) GUIDE PANEL, BACKLIGHT UNIT AND LIQUID CRYSTAL DISPLAY DEVICE INCLUDING THE SAME

(71) Applicant: LG DISPLAY CO., LTD., Seoul (KR)

(72) Inventor: Mi Ok Kim, Seo-gu Busan (KR)

(73) Assignee: LG DISPLAY CO., LTD., Seoul (KR)

( * ) Notice: Subject to any disclaimer, the term of this patent is extended or adjusted under 35 U.S.C. 154(b) by 7 days.

(21) Appl. No.: 14/965,311

(22) Filed: Dec. 10, 2015

(65) Prior Publication Data

US 2016/0170133 A1 Jun. 16, 2016

(30) Foreign Application Priority Data

Dec. 11, 2014 (KR) .................. 10-2014-0178086

(51) Int. Cl.
*F21V 8/00* (2006.01)

(52) U.S. Cl.
CPC .......... *G02B 6/0088* (2013.01); *G02B 6/0076* (2013.01)

(58) Field of Classification Search
CPC ... G02B 6/0088; G02B 6/0076; G02B 6/0075
See application file for complete search history.

(56) References Cited

U.S. PATENT DOCUMENTS

| | | | |
|---|---|---|---|
| 2001/0036057 A1* | 11/2001 | Fukuyoshi | G06F 1/1637 361/679.26 |
| 2005/0259191 A1 | 11/2005 | Park et al. | |
| 2008/0101001 A1* | 5/2008 | Shin | G02B 6/0088 361/679.01 |
| 2009/0257246 A1* | 10/2009 | Hsu | G02B 6/0088 362/633 |
| 2010/0321604 A1* | 12/2010 | Choi | G02B 6/0088 349/58 |
| 2011/0058117 A1* | 3/2011 | Ogatsu | H04M 1/0202 349/58 |
| 2011/0128463 A1* | 6/2011 | Ji | G02F 1/133308 349/58 |
| 2014/0063400 A1* | 3/2014 | Wang | G02F 1/133308 349/58 |

FOREIGN PATENT DOCUMENTS

| | | |
|---|---|---|
| CN | 1885132 A | 12/2006 |
| CN | 101025505 A | 8/2007 |
| CN | 101169538 A | 4/2008 |
| CN | 101248712 A | 8/2008 |
| CN | 102081259 A | 6/2011 |
| CN | 102692741 A | 9/2012 |
| CN | 102819131 A | 12/2012 |
| CN | 102914909 A | 2/2013 |
| CN | 103901642 A | 7/2014 |
| JP | H10153763 A | 6/1998 |

* cited by examiner

*Primary Examiner* — Michael H Caley
*Assistant Examiner* — Jonathan Y Jung
(74) *Attorney, Agent, or Firm* — Dentons US LLP

(57) ABSTRACT

A guide panel is disclosed which includes: a first guide panel configured to include a vertical portion, in which a first receiving hole is formed, and a horizontal portion in which a second receiving hole is formed, formed by from the vertical portion in a horizontal portion; and a second guide panel disposed on the horizontal portion and configured to include a first protrusion, which is combined with the first receiving hole, and a second protrusion which is combined with the second receiving hole.

10 Claims, 9 Drawing Sheets

GUIDE PANEL, BACKLIGHT UNIT AND LIQUID CRYSTAL DISPLAY DEVICE INCLUDING THE SAME

The present application claims priority under 35 U.S.C. § 119(a) of Korean Patent Application No. 10-2014-0178086 filed on Dec. 11, 2014, which is hereby incorporated by reference in its entirety for all purposes as if fully set forth herein.

BACKGROUND

Field of the Disclosure

The present application relates to a guide panel. Also, the present application relates to a backlight unit and a liquid crystal display device which each include the guide panel.

Description of the Related Art

The general liquid crystal display device displays a desired image by controlling light transmittances of liquid crystal cells, which are arranged in a matrix shape, according to image information signals. In other words, the liquid crystal display device displays images on a liquid crystal panel using light irradiated from a backlight unit.

The liquid crystal display device using the above-mentioned principle has features of thinner, lighter weight, lower power consumption and lower driving voltage. As such, the liquid crystal display device is being widely applied in a variety of fields.

For example, the liquid crystal display device is being used in office automation appliances, audio/video appliances and so on.

Such a liquid crystal display device controls light transmittances of liquid crystal cells using signals which are applied to a plurality of control switches arranged in a matrix shape. As such, a desired image is displayed on a screen.

Nowadays, the liquid crystal display device is being widely applied to monitors of the computers, television receivers, portable display devices, which include display devices of navigation systems for vehicles and mobile phones, and so on.

Such a liquid crystal display device is a non-emissive type device which displays images by adjusting the quantity of light applied from an external light source. As such, the liquid crystal display device is necessary for a backlight unit which includes a separated light source and applies light to the liquid crystal panel.

The backlight unit includes: light emitting diodes (LEDs) used as a light source; a light guide plate disposed opposite to a light emission surface of the LEDs; and a plurality of optical sheets disposed on the light guide plate. Also, the backlight unit includes a guide panel configured to support the liquid crystal panel and prevent light leakage.

Figure 1:
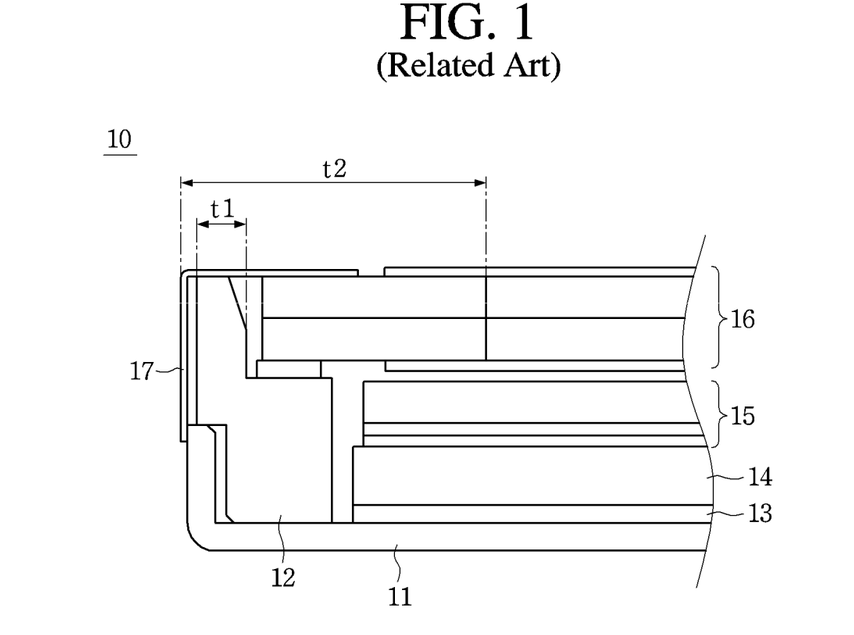
FIGS. 1 and 2 are cross-sectional views showing backlight units according to the related art.
Figure 2:
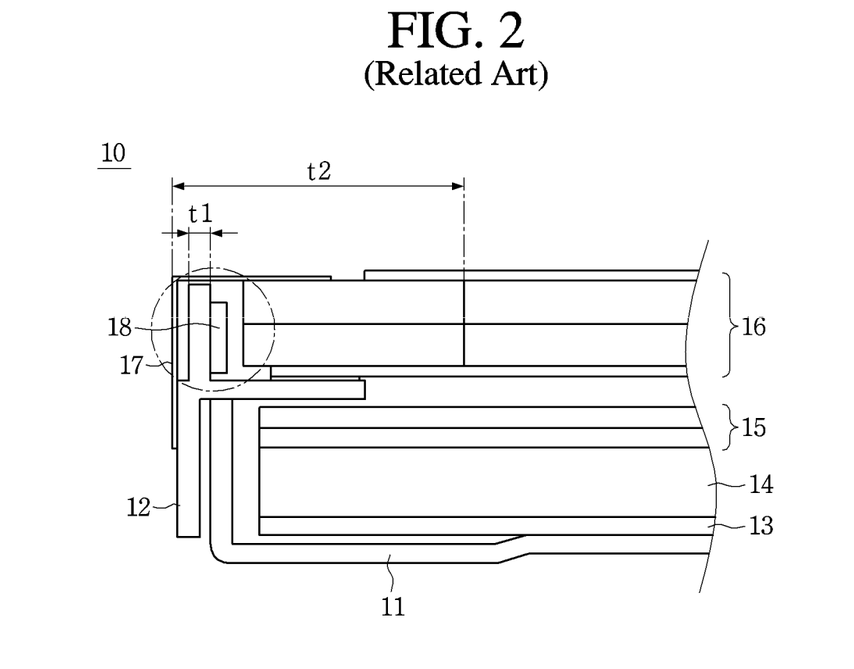

FIGS. 1 and 2 are cross-sectional views showing backlight units according to the related art.

Referring to FIG. 1, a backlight unit 10 of the related art includes a bottom cover 11; a guide panel 12 disposed on edges of the bottom cover 11; and a reflective sheet 13, a light guide plate 14, optical sheets 15 and a liquid crystal panel 16 received into the bottom cover 11. The backlight unit 10 further includes a light leakage prevention tape 17 encompassing an upper surface and side surfaces of the guide panel 12.

Such a guide panel 12 used in the related art backlight unit 10 is formed from a mold material. As such, not only the mold guide panel 12 must have large thicknesses t1 but also the width t2 of an externally exposed non-display area must increase. Due to this, it is difficult to realize slimness of the backlight unit and a narrow bezel.

Moreover, light can leak out between the liquid crystal panel 16 and the optical sheets 15. In order to prevent such a light leakage phenomenon, the light leakage prevention tape 17 is additionally used. As such, the fabrication cost of the backlight unit 10 must increase.

Referring to FIG. 2, another backlight unit 10 of the related art includes a bottom cover 11; a guide panel 12 disposed on edges of the bottom cover 11; and a reflective sheet 13, a light guide plate 14, optical sheets 15 and a liquid crystal panel 16 received into the bottom cover 11. Also, another backlight unit 10 further includes a light leakage prevention tape 17 encompassing an upper surface and side surfaces of the guide panel 12.

In order to realize slimness and the narrow bezel, the guide panel 12 used in another backlight unit 10 is formed from a press material. The guide panel 12 of the press material has a thinner thickness compared to that of the mold guide panel. However, the guide panel 12 cannot secure uniformity and must have a lower strength due to its thin thickness t1. As such, a circular part of the guide panel 12 represented by an alternate long and short dash line must be bent toward the inner direction of another backlight unit 10. Due to this, the guide panel 12 formed a metal material must damage a side surface (or an edge) of the liquid crystal panel 16. To this end, it must be necessary to use an additional pad member 18. Also, the guide panel 12 formed from the press material must cause light to leak because of its high reflectance. To address this matter, a light leak prevention tape 17 must be used in the backlight unit 10. Accordingly, the fabrication cost of the backlight unit 10 must increase. Moreover, because the width t2 of an externally exposed non-display area must increase, it is difficult to realize slimness of the backlight unit and a narrow bezel.

BRIEF SUMMARY OF THE INVENTION

Accordingly, embodiments of the present application are directed to a guide panel and a backlight unit including the same that substantially obviate one or more of problems due to the limitations and disadvantages of the related art.

The embodiments relate to provide a backlight unit that is adapted to simplify the structure by reducing the number of parts.

Also, the embodiments relate to provide a backlight unit that is adapted to reduce the development cost by removing a small number of parts.

Moreover, the embodiments relate to provide a backlight unit that is adapted to realize a narrow bezel by minimizing an externally exposed non-display area.

Further, the embodiments relate to provide a backlight unit with a guide panel which is adapted to enhance the hardness and minimize crack damage of a liquid crystal panel.

Furthermore, the embodiments relate to provide a guide panel capable of being easily formed.

Additional features and advantages of the embodiments will be set forth in the description which follows, and in part will be apparent from the description, or may be learned by practice of the embodiments. The advantages of the embodiments will be realized and attained by the structure particularly pointed out in the written description and claims hereof as well as the appended drawings.

According to a general aspect of the present embodiments, a backlight unit includes: a bottom cover; a first guide panel, in which at least one receiving hole is formed, configured to encompass side surfaces of the bottom cover; and a second guide panel disposed in an upper surface of the first guide panel and configured to include at least one protrusion which is combined with the at least one receiving hole. Also, a guide panel according to another general aspect of the present embodiments includes: a first guide panel configured to include a vertical portion, in which a first receiving hole is formed, and a horizontal portion in which a second receiving hole is formed, formed by from the vertical portion in a horizontal portion; and a second guide panel disposed on the horizontal portion and configured to include a first protrusion, which is combined with the first receiving hole, and a second protrusion which is combined with the second receiving hole. The first and second protrusions are formed in a reverse-tapered shape.

In the backlight unit according to a general aspect of the present embodiments, the first guide panel includes a vertical portion configured to encompass outer side surfaces of the bottom cover and a horizontal portion configured to cover an upper edge of an opening of the bottom cover by inwardly expanding from the vertical portion. As such, the horizontal portion can reduce the light leak and enhance a light input ratio by intercepting or reflecting lights from a light guide plate and a light source.

The at least one receiving hole includes a first receiving hole formed in the vertical portion and the at least one protrusion includes a first protrusion combined with the first receiving hole. Also, the at least one receiving hole further includes a second receiving hole formed in the horizontal portion and the at least one protrusion further includes a second protrusion combined with the second receiving hole. As such, a fastening force in an a-b direction (or a vertical direction) can be reinforced (or enhanced) and another fastening force in a c-d direction (or a horizontal direction can be reinforced (or enhanced). Therefore, any damage of a side surface (or the edge) of a liquid crystal panel can be prevented even though the second guide panel is bent toward the inner direction of the backlight unit.

The protrusion can be formed in a reverse-tapered shape. The first and second receiving holes can be formed in the same shape as the first and second protrusions. The second guide panel is formed from a mold material. The first protrusion is formed by downwardly protruding from a rear surface of second guide panel, and the second protrusion is formed by protruding from the rear surface of the second guide panel toward an outer direction of an inner side surface of the second guide panel. In this manner, a mold material with high moldability and contractibility can be easily injected into and spread within each of the first and second receiving holes of the second guide panel because the first and second receiving holes have the same reverse-tapered shape as first and second protrusions of the second guide panel. As such, the mold material can be densely (or completely) filled into each of the first and second receiving holes of the first guide panel. In accordance therewith, the combinative force between the first and second guide panels can increase.

Other systems, methods, features and advantages will be, or will become, apparent to one with skill in the art upon examination of the following figures and detailed description. It is intended that all such additional systems, methods, features and advantages be included within this description, be within the scope of the present disclosure, and be protected by the following claims. Nothing in this section should be taken as a limitation on those claims. Further aspects and advantages are discussed below in conjunction with the embodiments. It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the embodiments and are incorporated herein and constitute a part of this application, illustrate embodiment(s) of the present disclosure and together with the description serve to explain the disclosure. In the drawings.

DETAILED DESCRIPTION OF THE EMBODIMENTS

Reference will now be made in detail to a guide panel and a backlight unit including the same in accordance with the embodiments of the present disclosure, examples of which are illustrated in the accompanying drawings. These embodiments introduced hereinafter are provided as examples in order to convey their spirits to the ordinary skilled person in the art. Therefore, these embodiments might be embodied in a different shape, so are not limited to these embodiments described here. In the drawings, the size, thickness and so on of a device can be exaggerated for the convenience of explanation. Wherever possible, the same reference numbers will be used throughout this disclosure including the drawings to refer to the same or like parts.

Advantages and features of the present disclosure, and implementation methods thereof will be clarified through the following embodiments described with reference to the accompanying drawings. These embodiments introduced hereinafter are provided as examples in order to convey their spirits to the ordinary skilled person in the art. As such, these embodiments might be embodied in a different shape, so are not limited to these embodiments described here. Therefore, the present disclosure must be defined by scopes of claims.

The same reference numbers will be used throughout this disclosure to refer to the same or like parts. The size or the relative size of a layer or a region in the drawings can be exaggerated for the definiteness of explanation.

The terms within the present disclosure are used for explaining embodiments, but they do not limit the present disclosure. As such, the singular forms used in the present disclosure are intended to include the plural forms, unless the context clearly indicates otherwise. The terms "comprises" and/or "comprising" described in the present disclosure specify the presence of stated components, steps, operations and/or elements, but do not preclude the presence or addition of one or more other components, steps, operations, elements and/or groups thereof.

Guide Panel According to an Embodiment

Figure 3:
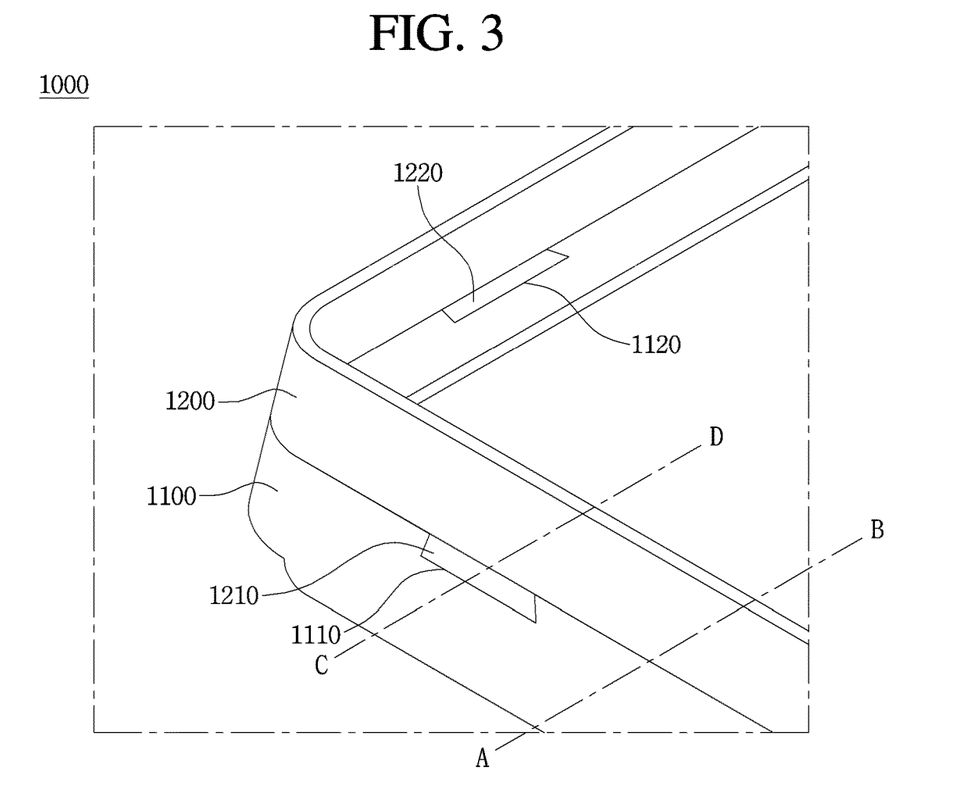
FIG. 3 is a perspective view showing a part of a guide panel according to an embodiment of the present disclosure.

FIG. 3 is a perspective view showing a part of a guide panel according to an embodiment of the present disclosure.

Referring to FIG. 3, the guide panel 1000 according to an embodiment of the present disclosure can include a first guide panel 1100 and a second guide panel 1200 combined with the first guide panel 1100.

At least one receiving hole 1110 and 1120 can be formed in the first guide panel 1100. The second guide panel 1200 can include at least one protrusion 1210 and 1220 being combined with (or received into) the at least one receiving hole 1110 and 1120.

Each of the first and second guide panels 1100 and 1200 can be formed in a quadrilateral rim shape. Also, the first and second guide panels 1100 and 1200 can be combined with each other by means of the receiving hole 1110 and 1120 and the protrusion 1210 and 1220. As such, the guide panel 1000 with a quadrilateral rim shape can be provided.

Figure 4:
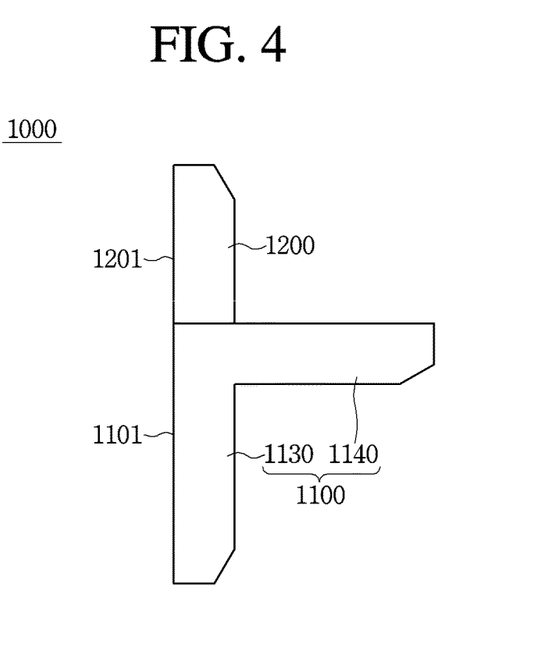
FIG. 4 is a cross-sectional view showing the guide panel taken along a line A-B in FIG. 3.

FIG. 4 is a cross-sectional view showing the guide panel 1000 taken along a line A-B in FIG. 3.

As shown in FIG. 4, the guide panel 1000 can include the first guide panel 1100 and the second guide panel 1200. The first guide panel 1100 can include a vertical portion 1130 and a horizontal portion 1140. The horizontal portion 1140 can be formed in such a manner as to laterally expand from the top edge of the vertical portion 1130. The vertical portion 1130 can be perpendicular to the bottom surface of a bottom cover 2000 which will be described later. Also, the vertical portion 1130 can be perpendicular to the horizontal portion 1140. The horizontal portion 1140 can be disposed parallel to the bottom surface of the bottom cover 2000.

The second guide panel 1200 can be perpendicular to the horizontal portion 1140 of the first guide panel 1100. The outer surface 1201 of the second guide panel 1200 can form the same surface as the outer surface 1101 of the vertical portion 1130 of the first guide panel 1100.

Figure 5:
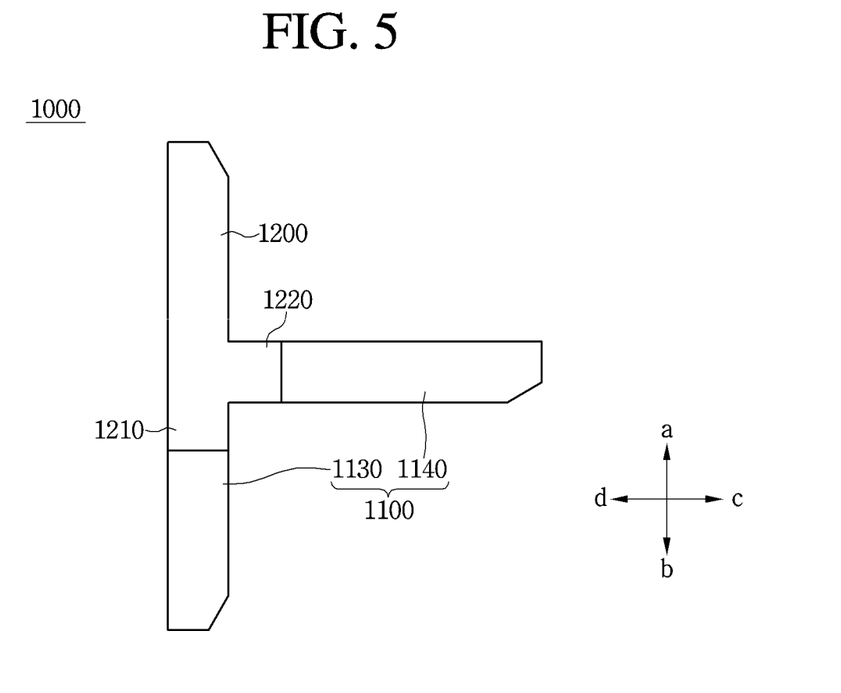
FIG. 5 is a cross-sectional view showing the guide panel taken along another line C-D in FIG. 3.

FIG. 5 is a cross-sectional view showing the guide panel taken along another line C-D in FIG. 3.

Referring to FIG. 5, the second guide panel 1200 of the guide panel 1000 can include at least one protrusion 1210 and 1220. The at least one protrusion can include a first protrusion 1210 and a second protrusion 1220. The first protrusion 1210 can be formed in such a manner as to downwardly protrude from the rear surface of the second guide panel 1200. The second protrusion 1220 can be formed in such a manner as to protrude from the rear surface of the second guide panel 1200 toward an outer direction of the inner side surface of the second guide panel 1200. In other words, the second protrusion 1220 can be formed by protruding from the rear surface of the second guide panel 1200 in a parallel direction with the horizontal portion 1140.

On the other hand, the first guide panel 1100 of the guide panel 1000 can include at least one receiving hole 1110 and 1120. The at least one receiving hole can include a first receiving hole 1110 and a second receiving hole 1120. The first receiving hole 1110 can be formed in the top edge of the vertical portion 1130 of the first guide panel 1100 which is opposite to the first protrusion 1210. The second receiving hole 1120 can be formed in an edge of the horizontal portion 1140 which is adjacent to the vertical portion 1130 and opposite to the second protrusion 1220. Also, the first receiving hole 1110 and the second receiving hole 1120 can be formed in a single hole united with each other.

As such, the first protrusion 1210 can be combined with the vertical portion 1130. Also, the second protrusion 1220 can be combined with the horizontal portion 1140.

In accordance therewith, a combined force of the first and second guide panels 1100 and 1200 in an a-b direction (i.e., a vertical direction) can be reinforced by the first protrusion 1210 and the first receiving hole 1110. Similarly, another combined force of the first and second guide panels 1100 and 1200 in a c-d direction (i.e., a horizontal direction) can be reinforced by the second protrusion 1220 and the second receiving hole 1120.

Second Guide Panel According to an Embodiment

Figure 6A:
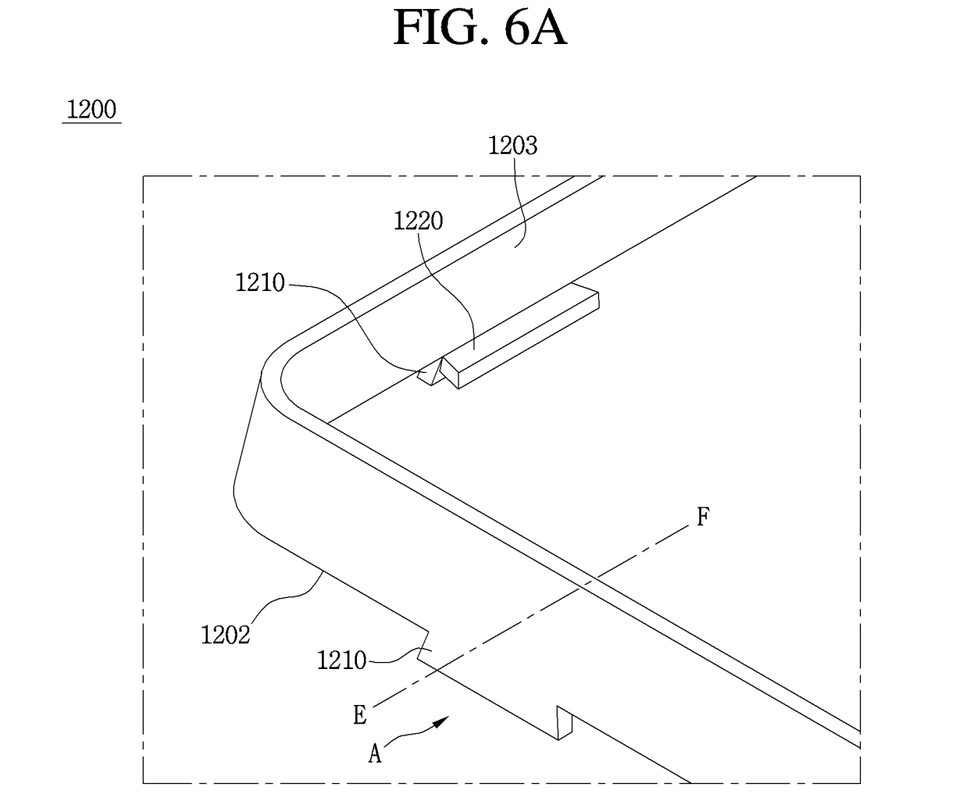
FIG. 6A is a perspective view showing a second guide panel according to an embodiment of the present disclosure which is taken in an upward direction.
Figure 6B:
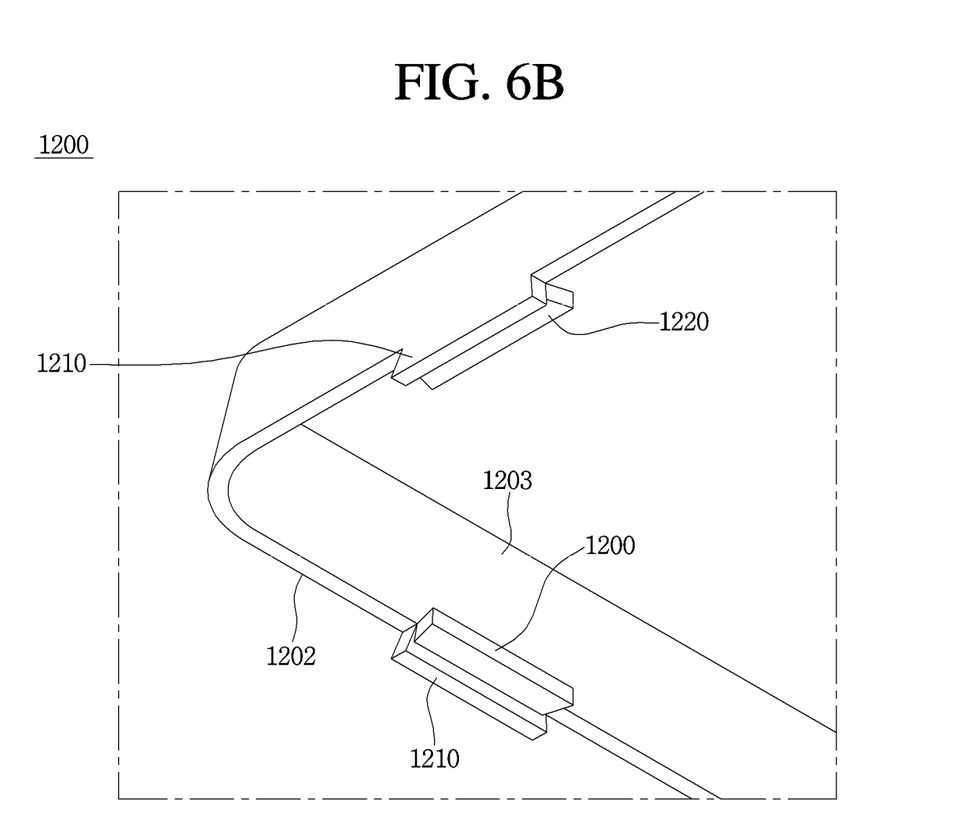
FIG. 6B is a perspective view showing a second guide panel according to an embodiment of the present disclosure which is taken in a downward direction.
Figure 7:
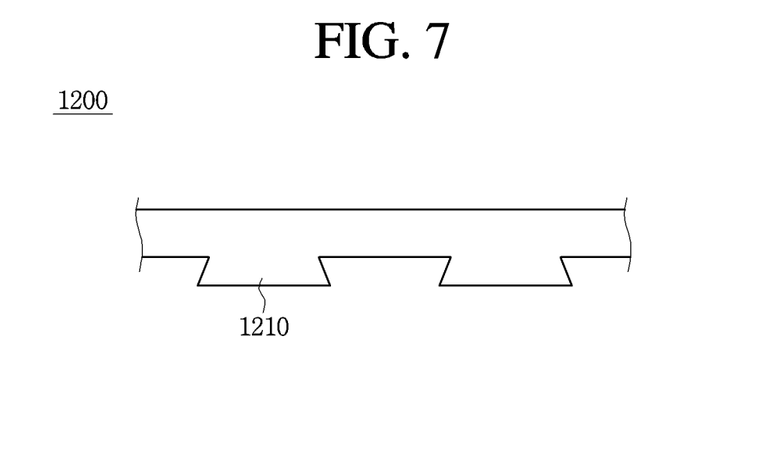
FIG. 7 is a side view taken the second guide panel in a direction A of FIG. 6A.
Figure 8:
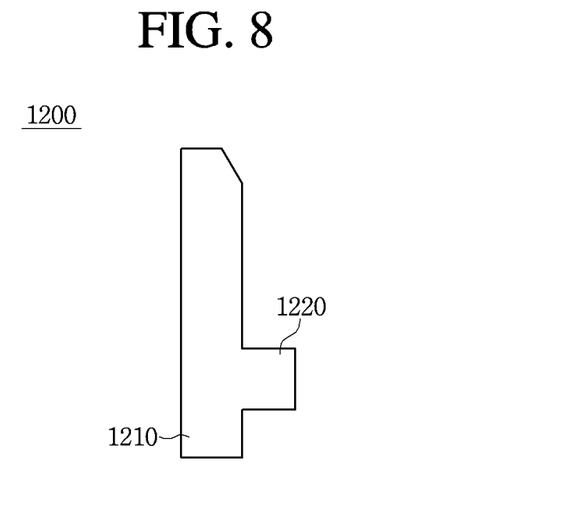
FIG. 8 is a cross-sectional view showing the guide panel which is taken along a line E-F of FIG. 6A.
Figure 9:
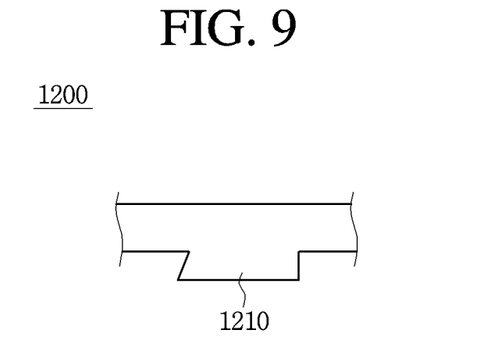
FIGS. 9 and 10 are side views showing second guide panels according to embodiments of the present disclosure.
Figure 10:
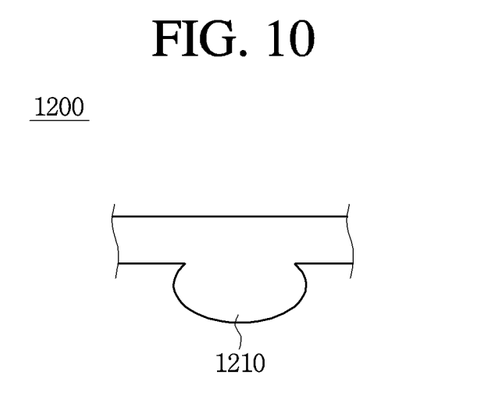

FIG. 6A is a perspective view showing a second guide panel according to an embodiment of the present disclosure which is taken in an upward direction. FIG. 6B is a perspective view showing a second guide panel according to an embodiment of the present disclosure which is taken in a downward direction. FIG. 7 is a side view taken the second guide panel in a direction A. FIG. 8 is a cross-sectional view showing the guide panel which is taken along a line E-F of FIG. 6A. FIGS. 9 and 10 are side views showing second guide panels according to embodiments of the present disclosure.

Referring to FIGS. 6A, 6B, 7 and 8, the second guide panel 1200 with the quadrilateral rim shape can include at least one first protrusion 1210 and at least one second protrusion 1220. The first and second protrusions 1210 and 1220 can be formed at a position corresponding to each other. In other words, the first and second protrusions 1210 and 1220 can be formed at the same region of the rear surface of the second guide panel 1200.

In detail, the first protrusion 1210 can be formed by downwardly protruding from the rear surface 1202 of the second guide panel 1200. The second protrusion 1220 can be formed by outwardly protruding from the rear surface 1202 of the second guide panel 1200 toward an outer direction of the inner side surface 1203 of the second guide panel 1200. Also, the first and second protrusions 1210 and 1220 can be formed at the same position of the rear surface 1202 of the second guide panel 1200. Alternatively, the first and second protrusions 1210 and 1220 can be formed at different positions of the rear surface 1202 of the second guide panel 1200 from each other. However, in order to enhance efficiency of the fabrication procedure of the guide panel 1000, it is preferable to form the first and second protrusions 1210 and 1220 at a position corresponding to each other.

Each of the first and second protrusions 1210 and 1220 can be formed in a reverse-tapered shape. As such, the first protrusion 1210 downwardly protruding from the rear surface 1202 of the second guide panel 1202 can become greater in width as it is further away from the rear surface 1202 of the second guide panel 1200. Similarly, the second protrusion 1220 protruding from the rear surface 1202 toward the outer direction of the inner side surface 1203 of the second guide panel 1200 can become greater in width as it is further away from the inner side surface 1203 of the second guide panel 1200. In other words, each of the first and second protrusions 1210 and 1220 can be formed in a trapezoid shape.

Alternatively, the first and second protrusions 1210 and 1220 of the second guide panel 1200 can be formed in such a manner as to outwardly expand its one side edge as shown in FIG. 9. In another different manner, the first and second protrusions 1210 and 1220 of the second guide panel 1200 can be formed in one of circular and elliptical shapes as shown in FIG. 10. However, in order to increase the combinative force between the first guide panel 1100 and the second guide panel 1200 and be easy to fabricate the second guide panel 1200, it is preferable to form the first and second protrusions 1210 and 1220 in the trapezoid shape.

Meanwhile, the second guide panel 1200 can be formed from a mold material. Also, the second guide panel 1200 can be formed to have a black color.

First Guide Panel According to an Embodiment

Figure 11:
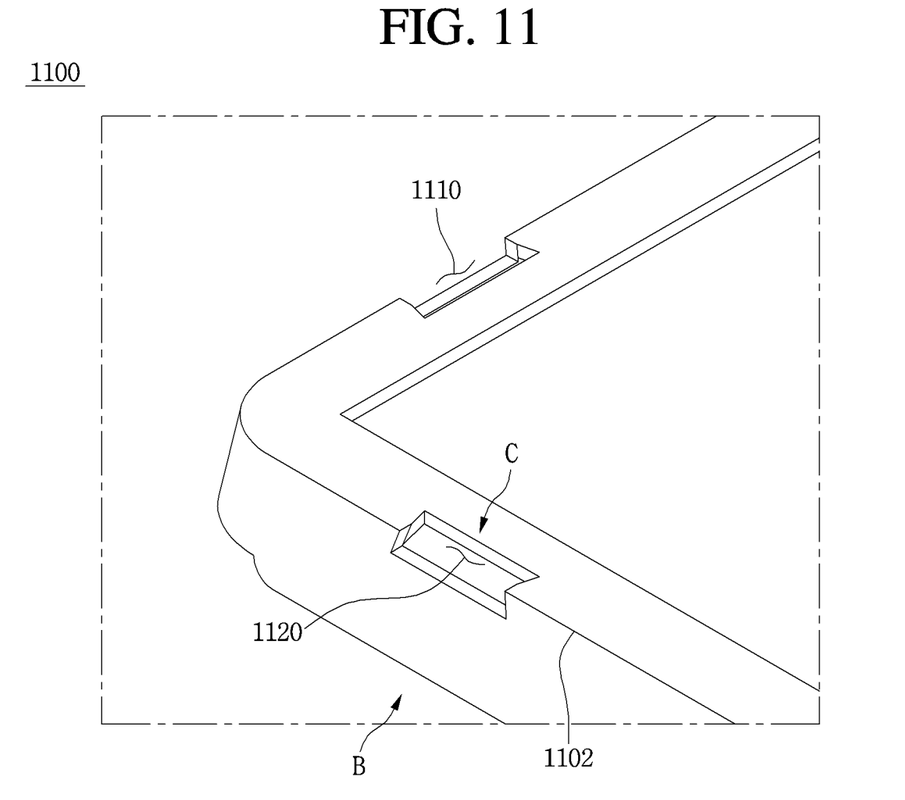
FIG. 11 is a perspective view a first guide panel according to an embodiment of the present disclosure.
Figure 12:
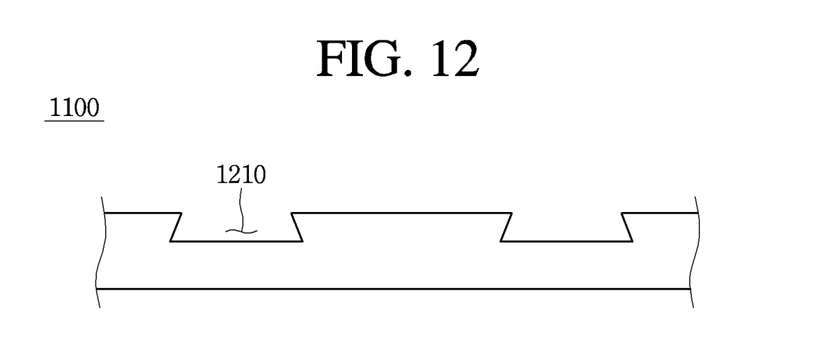
FIG. 12 is a side view showing the first guide panel which is taken in a direction B of FIG. 11.
Figure 13:
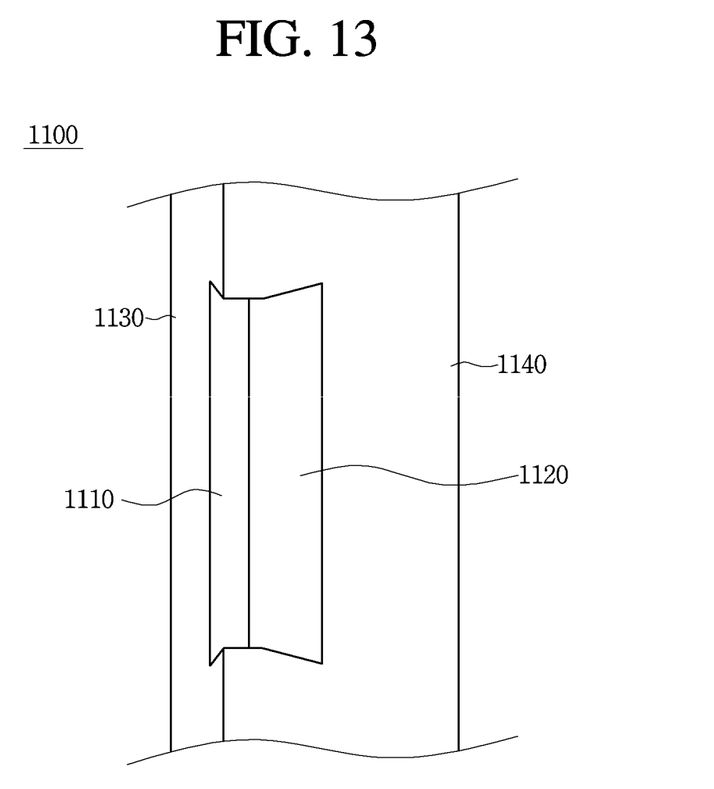
FIG. 13 is a perspective view showing the first guide panel which is taken in a direction C.

FIG. 11 is a perspective view a first guide panel according to an embodiment of the present disclosure. FIG. 12 is a side view showing the first guide panel which is taken in a direction B of FIG. 11. FIG. 13 is a perspective view showing the first guide panel which is taken in a direction C.

Referring to FIGS. 11 and 12, the first guide panel 1100 can include a vertical portion 1130 and a horizontal portion 1140. At least one first receiving hole 1110 can be formed in the upper surface 1102 (or the upper edge) of the vertical portion 1130. The first receiving hole 1110 can receive the first protrusion 1210 of the second guide panel 1200. Also, at least one second receiving hole 1120 can be formed in one side edge of the horizontal portion 1140 adjacent to the upper surface 1102 of the vertical portion 1130. The second receiving hole 1120 can receive the second protrusion 1220 of the second guide panel 1200. Such first and second receiving holes 1110 and 1120 can be formed in the regions of the first guide panel 1100 opposite to the first and second protrusions 1210 and 1220.

The first and second protrusions 1210 and 1220 can be formed at the same position of the second guide panel 1200. In this case, the first and second receiving holes 1110 and 1120 can be formed the same region of the upper area of the first guide panel 1100. As such, the first and second receiving holes 1110 and 1120 can be formed in a single hole united with each other.

Such a first guide panel 1100 can be formed from a metal material.

Backlight Unit and Liquid Crystal Display Device According to Embodiments

Figure 14:
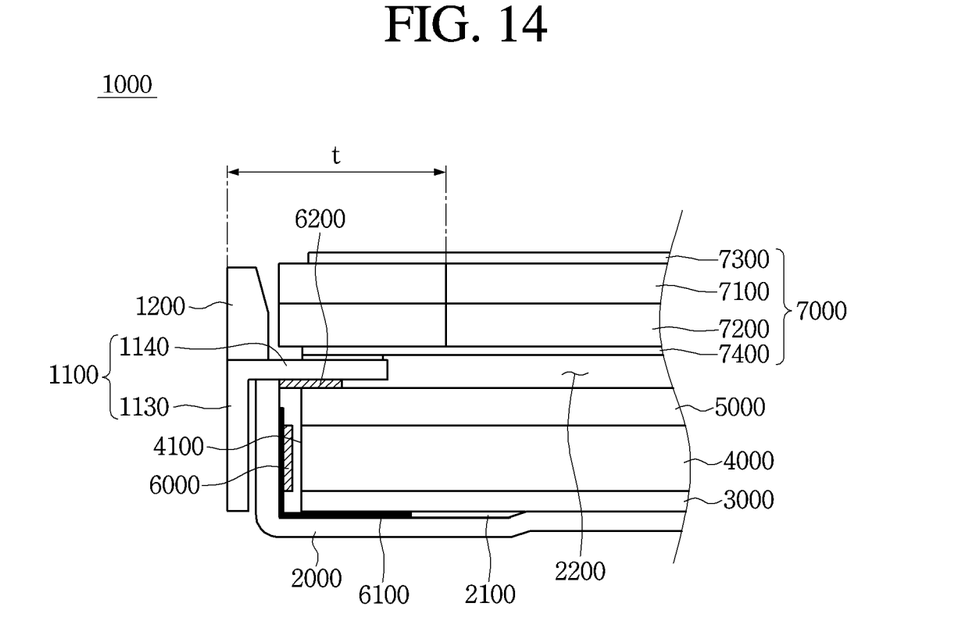
FIG. 14 is a cross-sectional view showing a backlight unit according to an embodiment of the present disclosure.

FIG. 14 is a cross-sectional view showing a backlight unit according to an embodiment of the present disclosure.

Referring to FIG. 14, the backlight unit 1000 according to an embodiment of the present disclosure can include a guide panel 1100, a bottom cover 2000, a reflective sheet 3000, a light guide plate 4000, optical sheets 5000 and a liquid crystal panel 7000.

Also, the backlight unit 1000 can include a light source 6000, a printed circuit board 6100 configured to generate an electrical signal which is used to drive the light source 6000, and a light source housing 6200. The light source 6000 can emit light when the electrical signal is applied from the printed circuit board 6100. Such a light source 6000 can include one of a cold cathode fluorescent lamp (CCFL), an external electrode fluorescent lamp (EEFL) and light emitting diodes (LEDs) can be used. As an example, the light emitting diodes (LEDs) can be applied to the light source 6000.

The light source 6000 can be disposed in a side surface of the bottom cover 2000. Also, the light source 6000 can be disposed on an upper surface of the printed circuit board 6100. The printed circuit board 6100 can be disposed on a bottom surface of the bottom cover 2000. The light source housing 6200 can be disposed above the light source 6000.

The light guide plate 4000 can be disposed on the upper surface of the printed circuit board 6100. An incident plane of the light guide plate 4000 can be disposed to face the light source 6000. A part of the light source housing 6200 can be disposed on an edge of the upper surface of the light guide plate 4000. Also, the light guide plate 4000 can be formed from polymethylmethacrylate (PMMA). The PMMA is not easily deformed or broken because of its high strength. Also, the PMMA has a superior transmittance. Such a light guide plate 4000 can become one of a wedge type and a plate type. The wedge type has an inclined lower surface and a flattened upper surface. The plate type has parallel lower and upper surfaces.

The reflective plate 3000 can enhance light efficiency by reflecting light, which is output from the lower surface of the light guide plate, toward the light guide plate 4000. Also, the reflective plate 3000 can adjust a reflective quantity for entire incident light and allow brightness to be uniformly distributed throughout a light output surface of the light guide plate 4000. In order to serve as a reflective sheet, the reflective plate 3000 can include a reflective material layer coated on its inner surface.

The optical sheet 5000 can include a diffusive sheet, a prism sheet and a protective sheet. If necessary, the optical sheets 5000 can include two diffusive sheets and two prism sheets.

The diffusive sheet can include a base film and an embossed layer coated on the base film. Such a diffusive sheet diffuses light from the light guide plate 4000 and applies diffused light to the liquid crystal panel 7000. Also, the diffusive sheets can be used by twos or threes in an overlapped state.

The prism sheet can be formed to include micro-prisms which each have a triangular column shape and are uniformly arranged in its an upper surface. Such a prism sheet can converge diffused light from the diffusive sheet in a perpendicular direction to a lower surface of the liquid crystal panel 7000. Also, the prism sheet is generally used by twos. Each of the micro-prisms formed on the prism sheet has a fixed apex angle. As such, light passing through the prism sheet progresses perpendicularly to the lower surface of the liquid crystal panel 7000. In accordance therewith, brightness with uniform distribution can be applied to the liquid crystal panel 7000.

The protective sheet is disposed in the uppermost layer of the optical layers 5000. Such a protective sheet can protect the prism sheet which is weak against a scratch.

The liquid crystal panel 7000 can include an upper substrate 7100 and a lower substrate 7200. The liquid crystal panel 7000 can be driven by another printed circuit board (not shown). To this end, the liquid crystal panel 7000 can be electrically connected to another printed circuit board through a flexible printed circuit. The flexible printed circuit (FPC)(not shown) can provide an electrical path which transfers signals from another printed circuit board to the liquid crystal panel 7000. In detail, the liquid crystal panel 7000 includes a color filter array substrate 7100 corresponding to the upper substrate, a thin film transistor array substrate 7200 corresponding to the lower substrate, and a liquid crystal layer interposed between the two substrates 7100 and 7200. Also, the liquid crystal panel 7000 can include a front polarizing plate 7300, which is attached to an upper surface of the color filter array substrate 7100, and a rear polarizing plate 7400 which is attached to a rear surface of the thin film transistor array substrate 7200. The front and rear polarizing plates 7300 and 7400 are used to cross-polarize light passing through the color filter array substrate 7100 and the thin film transistor array substrate 7200. In other words, the liquid crystal panel 7000 includes liquid crystal cells which are used as unit pixels and arranged in a matrix shape. Such a liquid crystal panel 7000 adjusts transmittances of the liquid crystal cells in response to image signal information applied from another printed circuit board, in order to display image.

The thin film transistor array substrate 7200 includes a plurality of gate lines and a plurality of data lines which are formed in a matrix shape. Also, the thin film transistor array substrate 7200 includes thin film transistors (TFTs) formed at intersections of the gate lines and the data lines.

The signal voltage transferred from another PCB can be applied between a pixel electrode, which is connected to the thin film transistor, and a common electrode on the color filter array substrate 7100. As such, liquid crystal molecules between the pixel electrode and the common electrode are aligned according to the signal voltage. In accordance therewith, transmittance of the liquid crystal cell can be adjusted.

An edge of at least one of the optical sheets 5000 can be disposed above an edge of the upper surface of the light source housing 6200. In this case, the edge of the at least one of the optical sheets 5000 can be disposed on the upper surface of the horizontal portion 1140 of the second guide panel 1100. As such, light leaking from the light source 6000 and the light guide plate 4000 can be intercepted and reflected. In accordance therewith, light efficiencies of the backlight unit and the liquid crystal display device can be enhanced.

An inner side surface of a vertical portion 1130 of a first guide panel 1100 included in the guide panel 1000 can face and contact the outer side surface of the bottom cover 2000. The rear surface of a horizontal portion 1140 of the first guide panel 1100 can come in contact with the upper surface of the side wall of the bottom cover 2000. Also, the horizontal portion 1140 of the first guide panel 1100 can be interposed between the edge of the rear surface of the liquid crystal panel 7000 and the edge of the upper surface of the optical sheets 5000. Moreover, the horizontal portion 1140 of the first guide panel 1100 can cover the upper edge of an opening 2200 of the bottom cover 2000. In other words, the guide panel 1000 can be disposed in such a manner as to encompass (or cover) not only the outer side surface of the bottom cover 2000 but also the upper edge of an opening 2200 of the bottom cover 2000.

The guide panel 1100 as well the backlight unit 1000 and the liquid crystal display device using the same according to embodiments of the present disclosure enable the first and second guide panels 1100 and 1200 separated from each other to be combined with each other by means of the protrusions and the receiving holes. Also, the first and second guide panels 1100 and 1200 can be formed from different materials from each other. As such, the first and second guide panels 1100 and 1200 can be prepared (or fabricated) in consideration of the effects of preventing damage and light leak, which are caused by the strength and the fractions with different components, and realizing the narrow bezel.

The second guide panel 1200 can be formed from a mold material. The mold material forming the second guide panel 1200 can minimize crack phenomena, which are generated in the side surface of the liquid crystal panel 7000, because its strength property. As such, a pad member interposed between the second guide panel 1200 and the side surface of the liquid crystal panel 7000 can be removed. In accordance therewith, the fabrication costs of the backlight unit 100 and the liquid crystal display device can be reduced. As the additional pad member is removed, the widths of the backlight unit 100 and the liquid crystal display device can be reduced. Therefore, it is easy to realize the narrow bezel.

Also, the second guide panel 1200 formed from the mold material can have the black color. As such, the reflection of light can be minimized and the deterioration of visibility caused by a light leak can be prevented. In accordance therewith, an additional light leak prevention member such as a light leak prevention tape or others can be removed. Therefore, not only the fabrication costs of the backlight unit 100 and the liquid crystal display device can be reduced, but also an effect of preventing the light leak can be provided.

The first guide panel 1100 includes the vertical portion 1130 and the horizontal portion 1140. The horizontal portion 1140 can reduce the light leak and enhance a light input ratio by intercepting or reflecting lights from the light guide plate 4000 and the light source 6000. Such a first guide panel 1100 can secure high strength by being formed from a metal material. As such, the horizontal portion 1140 of the first guide panel 1100 formed from the metal material can reflect almost all light from the light guide plate 4000 and the light source 6000 toward the light guide plate 4000 because of having a high reflectance. In accordance therewith, the light input ratio of the light guide plate 4000 can become higher.

Also, the second guide panel 1200 can be simultaneously combined with the first guide panel 1100 at its formation (or fabrication) through a process of injecting a mold material into first and second receiving holes 1110 and 1120 of the first guide panel 1200. The mold material with high moldability and contractibility can be easily injected into and spread within each of the first and second receiving holes 1110 and 1120 of the second guide panel 1200 because the first and second receiving holes 1110 and 1120 have the same reverse-tapered shape as first and second protrusions 1210 and 1220 of the second guide panel 1200. As such, the mold material can be densely (or completely) filled into each of the first and second receiving holes 1110 and 1120 of the first guide panel 1100. In accordance therewith, the combinative force between the first and second guide panels 1100 and 1200 can increase.

Meanwhile, the second guide panel 1200 including the first protrusion 1210 can reinforce (or enhance) a fastening force in an a-b direction (or a vertical direction) of FIG. 5 using the first protrusion 1210. Also, the second guide panel 1200 including the second protrusion 1220 can reinforce (or enhance) another fastening force in a c-d direction (a horizontal direction) of FIG. 5 using the second protrusion 1220. The fastening force reinforced in the c-d direction by the second protrusion 1220 can prevent the damage of the side surface (or the edge) of the liquid crystal panel 7000 even though the second guide panel 1200 is bent toward the inner direction of the backlight unit 100.

As described above, the backlight unit according to an embodiment of the present disclosure can simplify the structure by reducing the number of parts. Also, the backlight unit can reduce the development cost by removing a small number of parts. Moreover, the backlight unit can realize a narrow bezel by minimizing an externally exposed non-display area. Further, the guide panel and the backlight unit with the same according to embodiments of the present disclosure can reinforce (or enhance) the hardness and minimize crack damage of the liquid crystal panel. The guide panel can be easily formed (fabricated).

Although the present disclosure has been limitedly explained regarding only the embodiments described above, it should be understood by the ordinary skilled person in the art that the present disclosure is not limited to these embodiments, but rather that various changes or modifications thereof are possible without departing from the spirit of the present disclosure. Accordingly, the scope of the present disclosure shall be determined only by the appended claims and their equivalents without being limited to the description of the present disclosure.

What is claimed is:

1. A backlight unit comprising:
a bottom cover;
a first guide panel comprising a metal material and having at least one receiving hole formed on a portion of the upper surface of the first guide panel and penetrating through the first guide panel, the first guide panel including a vertical portion overlapping with side surfaces of the bottom cover and a horizontal portion extending from the vertical portion;
a second guide panel comprising a mold material on the upper surface of the first guide panel and including at least one protrusion which is combined with the at least one receiving hole such that the at least one protrusion is received into the receiving hole, the second guide panel configured to enclose and protect side surfaces of a liquid crystal panel disposed on the horizontal portion of the first guide plate; and
a light source, a plurality of optical sheets and a light guide plate between the bottom cover and the horizontal portion of the first guide panel,
wherein the vertical portion overlaps with outer side surfaces of the bottom cover and the horizontal portion covers an upper edge of an opening of the bottom cover, the optical sheets and the light guide plate by extending toward an inside of the light guide plate such that light from the light guide plate is reflected off of a metal surface of the horizontal portion of the first guide panel and directed back toward the light guide plate,
wherein the at least one receiving hole includes a first receiving hole in the vertical portion,
wherein the at least one protrusion includes a first protrusion insert-molded and combined with the first receiving hole, wherein the at least one receiving hole further includes a second receiving hole in the horizontal portion, wherein the at least one protrusion further includes a second protrusion insert-molded and combined with the second receiving hole,
wherein the first protrusion and the first receiving hole reinforce a combined force of the first and second guide panels in a vertical direction, and the second protrusion and the second receiving hole reinforce another combined force of the first and second guide panels in a horizontal direction, and
wherein the second guide panel is perpendicular to the horizontal portion of the first guide panel.

2. The backlight unit of claim 1, wherein the first and second receiving holes combine to be a single hole.

3. The backlight unit of claim 2, wherein the first and second protrusions extend from a same location of the second guide panel.

4. The backlight unit of claim 3, wherein
the first protrusion protrudes downward from a rear surface of second guide panel, and
the second protrusion protrudes from the rear surface of the second guide panel toward the inside of the guide panel from an inner side surface of the second guide panel.

5. The backlight unit of claim 1, wherein the at least one protrusion has a reverse-tapered shape.

6. The backlight unit of claim 4, wherein the at least one receiving hole has a same shape as the at least one protrusion.

7. The backlight unit of claim 1, wherein the first and second guide panels are simultaneously combined with each other at a formation of the second guide panel.

8. The backlight unit of claim 1, wherein the mold material with high moldability and contractibility can be easily injected into and spread within the receiving hole.

9. The backlight unit of claim 1, wherein the receiving hole has a same reverse-tapered shape as the protrusion for increasing combinative force between the first and second guide panels.

10. A liquid crystal display device comprising:
a panel;
a backlight unit on the panel;
wherein the backlight unit comprises:
a bottom cover; a first guide panel comprising a metal material and having at least one receiving hole formed on a portion of the upper surface of the first guide panel and penetrating through the first guide panel, the first guide panel including a vertical portion overlapping with side surfaces of the bottom cover, and a horizontal portion,
a liquid crystal panel on the horizontal portion of the first guide panel;
a second guide panel comprising a mold material on the upper surface of the first guide panel and including at least one protrusion which is combined with the at least one receiving hole such that the at least one protrusion is received into the receiving hole, the second guide panel enclosing and protecting side surfaces of the panel disposed on the horizontal portion of the first guide plate; and
a light source, a plurality of optical sheets and a light guide plate between the bottom cover and the horizontal portion of the first guide panel,
wherein the first guide panel and the second guide panel comprise different materials,
wherein the vertical portion overlaps with outer side surfaces of the bottom cover and the horizontal portion covers an upper edge of an opening of the bottom cover, the optical sheets and the light guide plate by extending toward an inside of the light guide plate such that light from the light guide plate is reflected off of a metal surface of the horizontal portion of the first guide panel and directed back toward the light guide plate,
wherein the at least one receiving hole includes a first receiving hole in the vertical portion,
wherein the at least one protrusion includes a first protrusion insert-molded and combined with the first receiving hole,
wherein the at least one receiving hole further includes a second receiving hole disposed in the horizontal portion of the first guide panel,
wherein the at least one protrusion further includes a second protrusion insert-molded and combined with the second receiving hole,
wherein the first protrusion and the first receiving hole reinforce a combined force of the first and second guide panels in a vertical direction, and the second protrusion and the second receiving hole reinforce another combined force of the first and second guide panels in a horizontal direction, and wherein the second guide panel is perpendicular to the horizontal portion of the first guide panel.

* * * * *